United States Patent Office 2,768,932
Patented Oct. 30, 1956

2,768,932

TREATMENT OF HYDROFINED PETROLEUM DISTILLATES WITH COPPER

Geoffrey P. Richard, Drayton, James Stein, Milton Hill, near Abingdon, and Peter G. B. Hobsbawn, Oxford, England, assignors to Esso Research and Engineering Company, a corporation of Delaware No Drawing. Application August 17, 1953, Serial No. 374,835

Claims priority, application Great Britain October 23, 1952

4 Claims. (Cl. 196—36)

This process relates to a new and improved process for the treatment of mineral oil fractions and particularly relates to the treatment of mineral oil fractions in the vapour phase to reduce the corrosive sulphur content thereof.

Recent years has seen an increasing proportion of Middle East crude oils being utilised for the production of petroleum products. The use of these crudes has led to complications due to their high sulphur content, normally of the order of 2% of the crude. Such high sulphur crudes are, of course, found elsewhere, for example in the Heidelburg and Eucutta fields of Mississippi. However, in the Western hemisphere there are available large sources of low sulphur crude—e. g., East Texas about 0.1 to 0.15—so that these low sulphur crudes may be utilized for particularly critical services. It is now common practice, in the Eastern hemisphere, to operate a refinery entirely on high sulphur Middle East crudes and this practice provides considerables incentive for the adoption of process from the desulphurisation of products that were, at one time, normally made from low sulphur crudes.

Sulphur may be present in a number of forms. In "sour" crudes and distillates sulphur is present as mercaptans, a term that in the extreme may be regarded as embracing hydrogen sulphide. Commonly sour distillates are sweetened by any of a large variety of processes in which mercaptans are converted to disulphides. Sweetening processes generally do not substantially reduce the sulphur content of the distillate but simply transform this distillate to a more aggreeable form. Where the sulphur content must be low, other expedients are adopted. Very many suggestions have been made to this end. Among these may be mentioned: vapour phase treatment with cadmium sulphide to decompose mercaptans to H₂S and unsaturates, vapour phase bauxite treatment at 700–750° F., vapour phase treatment with finely divided zinc, copper, iron, lead, manganese and antimony, treatment with metallic sodium of 650–850° F., treatment with ferric oxide, low temperature treatment with oxides of copper, lead and iron, vapour phase treatment with calcium carbide, treatment with oxidising agents such as permanganates, treatment with miscellaneous contacting agents including granite, gravel, various metal oxides and peroxides, ozone and electric discharge, iron-silica gel containing copper sulphide, sodamide, colloidal sodium or iron hydrogen with phosgene and charcoal, wood, steel wool and steam, treatment with hydrated aluminium silicate catalyst containing oxides of nickel or cobalt, dehydrogenation using heavy metal oxides as catalysts. A particularly useful process of this type involves reacting the distillates to a greater or lesser extend in the presence of hydrogen and commonly a catalyst, in such a way that the sulphur compounds are reacted to form hydrogen sulphide. Such processes may broadly be called hydrogenation. Two processes of this type are called "hydrofining" and "autofining." In autofining the distillate is treated at between 650 and 820° F. and 25 to 500 p. s. i. in such a manner that the process is substantially self supporting with respect to the amount of hydrogen needed in the presence of a dehydrogenation-hydrogenation catalyst which is immune to sulphur poisoning and combines activity for the dehydrogenation of naphthenes to aromatics with activity for the hydrogenation of organically combined sulphur to hydrogen sulphides. A preferred catalyst comprises the combined oxides of cobalt and molybdenum supported on alumina. "Hydrofining" comprises a mild hydrogention using a fixed bed of a suitable catalyst (such as cobalt molybdate or molybdenum or alumina or nickel-tungsten sulphide) that operates at temperatures in the range of 500–700° F., pressures from 100 to 1,000 p. s. i. g. with recycle hydrogen rates in the order of 200 to 1,000 standard cubic feet per barrel of oil charged. Particularly useful hydrofining conditions comprise pressure in the neighbourhood of 200 p. s. i. g. at about 1 v./v./hr. and around 600–650° F. using cobalt molybdate on alumina catalyst and consuming in the region of 1,000 C. F./B. hydrogen.

The above mentioned processes are more or less effective in the reduction of total sulphur content and for most purposes they suffice. However, it may be necessary that the product shall be responsible for only the lightest corrosion of copper. The above processes are not all adequate in this respect as the treated distillates cause some copper corrosion believed to be due to the presence of elemental sulphur in the distillate. It is the object of the present invention to provide a process for the amelioration of residual corrosion in desulphurised distillates such as is caused by the presence of elemental sulphur. The invention is particularly usefully applied to petroleum fractions boiling in the white spirit boiling range that have been desulphurised by "hydrofining" or "autofining."

It has now been discovered that petroleum solvents having the desirable feature of low corrosivity to metals and relatively innocuous odour may be obtained from a petroleum distillate especially one that has been desulphurised, for example by hydrofining or autofining, by treating the petroleum distillate in the vapour phase with finely divided metallic copper or copper-containing alloy such as copper-bronze or with cupric oxide.

The invention accordingly comprises a method of treating petroleum distillates, especially hydrogenated petroleum distillates, to reduce their corrosivity to metals comprising contacting the distillate in the vapour phase with finely divided copper, copper-containing alloys or cupric oxide at an elevated temperature below the temperature at which substantial degradation of the petroleum distillate occurs.

The petroleum distillate to which the treatment is applied is preferably a white spirit.

The finely divided copper, copper alloy or cupric oxide is preferably supported on a support which is substantially inert in the presence of the distillate under the conditions of the treatment.

As mentioned above the treatment according to this invention is conducted in the vapour phase at an elevated temperature but at a temperature below that at which substantial degradation of the distillate will occur. A preferred temperature range is 230–600° F., especially 350–600° F. The duration and proportion of the treat will naturally depend on the corrosivity of the feed distillate, the desired corrosivity and the activity of the catalyst used. Generally speaking an effective space velocity may be found between 1 and 100 v./v./hr.

Experiments were conducted on the vapour-phase contacting of two samples of Kuwait white spirit with copper bronze powder. One of the samples was a hypochlorite-sweetened Kuwait white spirit, while the other was one that had been sweetened by hydrofining.

The hypochlorite-sweetened white spirit initially had a corrosivity as measured by the rating of the British Standards Institute of 10 and when passed over powdered copper-bronze at a temperature of 210° C., this corrosivity was reduced to 5 to 6. A similar sample of the same hypochlorite-sweetened white spirit was passed over powdered copper-bronze at a temperature of 325° C. and the corrosivity was reduced to 1 to 3. While this rating was suitable for use as a petroleum solvent the odour of the white spirit had not been sufficiently improved and even a final caustic washing did not reduce the odour of the spirit good enough for it to be considered of high quality.

A series of experiments on a hydrofined Kuwait white spirit however, gave results as listed in Table I below.

TABLE I

| Weight of Copper-Bronze Powder (gms.) | Space Velocity of White Spirit (wt./wt./hr.) | Temp. (° C.) | B. S. I. Rating of Product |
| --- | --- | --- | --- |
| 5 | 50 | 180 | 6 |
| 5 | 50 | 225 | 5 |
| 5 | 50 | 250 | 3 |
| 5 | 50 | 300 | 3 |

These figures show that the corrosivity of the treated product is good when the temperature of the treatment is greater than 225° C. Preferably the vapour-phase treatment is conducted at a temperature between 230 and 350° C., particularly between 250 and 325° C.

The odour of the product obtained by the copper-bronze treatment of the hydrofined white spirit was found to be innocuous.

When the copper, copper-alloy or copper oxide is to be deposited on an inert support, one useful method of deposition is to impregnate the carrier with a solution of a copper compound that is decomposable to the oxide and then to decompose the impregnant on the carrier. Thus the carrier may be impregnated with copper nitrate and then roasted to give copper oxide. The copper oxide may be further decomposed to metallic copper if desired. This process may be repeated in order to increase the amount of copper oxide on the carrier. The amount of copper oxide on the carrier can vary between quite wide limits. It is desirable that the surface is well coated so that the amount will naturally depend on the state of division of the carrier. An effective range may be from 1 to 100% by weight of the carrier.

The choice of the carrier is wide subject to limitations suggested above. Thus this support should be inert to the petroleum distillate at the temperature of treatment, moreover it should be physically strong and should not disintegrate or decompose at the temperature of treatment, regeneration or preparation. Supports having these properties are well known in the art and include such materials as pumice, silica gel, montmorillonite, silica and the like. Obviously a support having a large surface area will be more effective.

After a period of use the copper oxide treating material will lose some of its efficacy—probably due to formation of copper sulphide. The material can be regenerated by heating in the presence of air. The following reactions have been suggested for the regeneration:

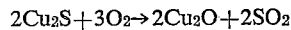

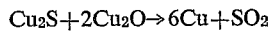

If this reaction is carried out at temperatures of the order of 400–500° C. it is found that considerable quantities of copper sulphate are formed, presumably from the reaction of sulphur trioxide with copper oxide. This side reaction is undesirable in the regeneration of these copper reagents since $CuSO_4$ is stable up to 650° C. and is said to be decomposed only at temperatures in the region of 730° C. Thus in order to use air at atmospheric pressures successfully in the regeneration of copper or copper oxide from copper sulphide an inconveniently high temperature would need to be employed. The use of this high temperature would probably necessitate transferring the treating material from the treatment vessel to a regeneration furnace.

Consideration of the equation $SO_2 + \frac{1}{2}O_2 \rightleftharpoons SO_3$ indicates that the ratio of sulphur trioxide to dioxide is proportional to the square root of the oxygen partial pressure. Thus provided that copper sulphate formed in the reaction of air with cuprous sulphide is formed by the reaction of sulphur trioxide with copper oxides, a sufficient reduction in the oxygen partial pressure should effectively eliminate the formation of copper sulphate. This has proved to be the case for at a temperature of 450° C. it has been found that the quantity of copper sulphate formed on treating cuprous sulphide with oxygen at a low partial pressure is proportional to the logarithm of the oxygen partial pressure. In the experiments carried out, steam was used as a diluent for the air, since previous experience has indicated that at the temperature used, steam is for all practical purposes inert to cuprous sulphide. In industrial practice, it would obviously be unnecessary to use steam as a diluent for air. Table II and the figure show the results obtained in these experiments. It will be noted that at 450° C. the limiting partial pressure of oxygen appears to be 0.00025 atm. Two experiments conducted at 500° C. indicated that at this temperature, oxygen at a partial pressure of 0.00035 can be used without sulphate being formed in detectable quantities. However, a considerable loss of activity has been observed after 7 cycles. This is probably due to mechanical loss of copper.

TABLE II

*Treatment of cuprous sulphide with air*

EFFECT OF OXYGEN PARTIAL PRESSURE ON SULPHATE FORMATION

Rate of water flow 10 ml./min.
Total pressure 830 mins. Hg (1.09 atm.)
} Reagent originally contained .03 gr. Sulphur per gr.

| Air Flow, Ml./mn. | $P_{O_2}$, atm. | Temp., ° C. | Time (hrs.) | Percent Cu as $CuSO_4$, Total Cu | Sulphur Removal per gr. Reagent |
| --- | --- | --- | --- | --- | --- |
| 500 | 0.0084 | 450 | 2 | 7.2 | 0.0139 |
| 400 | 0.0068 | 450 | 3 | 7.1 | 0.013 |
| 150 | 0.0027 | 450 | 3.5 | 5.4 | 0.0109 |
| 50 | 0.00087 | 450 | 4 | 2.68 | 0.015 |
| 20 | 0.00035 | 450 | 8 | 0.685 | 0.023 |
| 20 | 0.00035 | 500 | 5 | 0 | 0.013 |
| 20 | 0.00035 | 500 | 2 | 0 | 0.008 |

In order to test the effectiveness of this method of regeneration, an experiment has been made in which white spirit has been treated with a copper oxide reagent until it was exhausted, the reagent has been regenerated in accordance with the preferred scheme described immediately above, and again the reagent has been exhausted.

It will be seen from Table III that after 5 cycles comprising reaction and regeneration, the activity of the reagent has been maintained.

TABLE III

*Treatment of white spirit with copper reagent*

EFFECT OF REPEATED REGENERATION ON REAGENT LIFE

Feed stock _____ Raw Kuwait white spirit.
Temperature _____ 310° C.
Reagent _____ Cu O on pumice.
Mass of reagent _____ 1 gr.
Space velocity _____ 185 w./w./hr.

| Initial life (hours) | Life after $x$ regeneration (hours) | | | |
|---|---|---|---|---|
| | $x=1$ | 2 | 3 | 4 |
| 10.1 | 7.7 | 7.1 | 7.9 | 8.3 |

REGENERATION CONDITIONS

Temperature _____ 500° C.
Time _____ 5 hours.
Water flow _____ 10 ml./min.
Air flow _____ 20 ml./min. ($P_{O_2}=.00035$ atm.).

It is believed that at a temperature in the region of 300° C. the copper oxide reagent is tranformed into a more active state, probably cuprous oxide. Thus, a feedstock of B. S. I. copper rating equal to 10 when passed over the oxide at 180–190° C. has its B. S. I. rating reduced to 3–4, while at a temperature of 350° C. the B. S. I. rating is reduced to 1–2. However, if the oxide is used to treat a naphtha at 330° C. and the temperature is then reduced to 180–190° C. the B. S. I. rating of the resultant product remains at a level of 1–2. This is apparent from Table IV.

TABLE IV

*Treatment of raw Kuwait white spirit*

[B. S. I. = 10.]

| Run | Temp., ° C. | Space Vel., v./v./hr. | Product, B. S. I. Rating | Remarks |
|---|---|---|---|---|
| I | 330 | 27 | | |
| | 185 | 27 | 1–2 | |
| | | | 1–2 | Continuation of Run I. |
| II | 185 | 27 | 3–4 | Fresh Reagent. |

This improvement in the reactivity by treatment at higher temperature can also be seen from Table V where the improvement in B. S. I. rating is marked as the volume of feedstock increases.

TABLE V

*Treatment of hydrofined Kuwait white spirit*

| Run | Temp., ° C. | Space Vel., v./v./hr. | Product, B. S. I. Rating | Vol. of Feed | Remarks |
|---|---|---|---|---|---|
| III | 185 | 27 | 3–4 | 0–100 | Fresh oxide. |
| | 340 | 27 | 3 | 0–100 | |
| IV | 340 | 27 | 2–3 | 100–300 | |
| | 185 | 27 | 2 | 300–450 | |

Thus a preferred embodiment of this invention comprises first conditioning the reagent at a relatively high temperature, e. g., of the order of 250–350° C., and then treating the distillate with the conditioned reagent at a relatively lower temperature, e. g., of the order of 150–250° C.

What we claim is:

1. The process of treating hydrofixed petroleum distillates containing sulfur with a copper-containing material to reduce the sulfur content of said distillate, comprising the steps of vaporizing said distillate, contacting the resulting vapor in a reaction zone at a temperature of not more than about 350° C. with a finely divided copper-containing material selected from the group consisting of metallic copper, copper alloys, and cupric oxide, withdrawing petroleum vapor of reduced sulfur content from said reaction zone, and subsequently regenerating the spent copper-containing material in said reaction zone by contacting said spent material at a temperature of from about 400° C. to 500° C. and at substantially atmospheric pressure with an oxidizing gas comprising air and a diluent, whereby the partial pressure of oxygen in said oxidizing gas is substantially reduced, and subsequently re-using the regenerated copper-containing material to contact additional sulfur-containing petroleum distillate as aforesaid.

2. The process according to claim 1 wherein said diluent comprises steam.

3. The process according to claim 1 wherein the temperature in said reaction zone is maintained in the range of from about 230° C. to about 350° C.

4. The process according to claim 1 wherein said petroleum distillate is contacted with said copper-containing material in said reaction zone at a temperature in the range of from about 250–350° C., subsequently lowering the temperature in said reaction zone to a temperature in the range of from 150° C. to 250° C., and introducing additional sulfur-containing petroleum distillate into said reaction zone.

References Cited in the file of this patent

UNITED STATES PATENTS

| | | |
|---|---|---|
| 534,295 | Suckert | Feb. 19, 1895 |
| 537,121 | Lossen | Apr. 9, 1895 |
| 622,799 | Frasch | Apr. 11, 1899 |
| 1,753,859 | Gray | Apr. 8, 1930 |
| 1,944,170 | Darlington | Jan. 23, 1934 |
| 1,979,565 | Morrell et al. | Nov. 6, 1934 |